Sept. 8, 1970     I. N. BANCHIK ET AL     3,527,565
STEAM REFORMING OF CARBON MONOXIDE RICH HYDROCARBON FEEDS
Filed June 19, 1967     2 Sheets-Sheet 1

INVENTORS
I. N. Banchik
M. C. Sze
BY M. J. Maddock

Marn & Jangarathis
ATTORNEYS

Sept. 8, 1970  I. N. BANCHIK ET AL  3,527,565
STEAM REFORMING OF CARBON MONOXIDE RICH HYDROCARBON FEEDS
Filed June 19, 1967  2 Sheets-Sheet 2

INVENTORS
I. N. Banchik
M. C. Sze
M. J. Maddock
BY Marn & Jangarathis
ATTORNEYS

United States Patent Office 3,527,565
Patented Sept. 8, 1970

3,527,565
STEAM REFORMING OF CARBON MONOXIDE RICH HYDROCARBON FEEDS
Ira N. Banchik, Brooklyn, and Morgan C. Sze, Garden City, N.Y., and Maldwin J. Maddock, Elizabeth, N.J., assignors to The Lummus Company, New York, N.Y., a corporation of Delaware
Filed June 19, 1967, Ser. No. 647,021
Int. Cl. C01b 1/16
U.S. Cl. 23—212     3 Claims

ABSTRACT OF THE DISCLOSURE

A process and apparatus for steam reforming a hydrocarbon feed, rich in carbon monoxide wherein the feed is rapidly preheated to a temperature of above about 1300° F., in the absence of a reforming catalyst, and then heated in the presence of a reforming catalyst to produce a hydrogen containing effluent. The preheating is effected in the radiant heating section of a reformer furnace, by providing the upper portion of the tubes of the radiant heating section with a plug to increase the mass velocity of the feed flowing therethrough and thereby increase the heat transfer rate.

---

This invention relates to the production of hydrogen, and more particularly to an improved process and apparatus for reforming a carbon monoxide-rich hydrocarbon feed gas.

The process of steam reforming a hydrocarbon, such as natural gas, may be used to produce a hydrogen containing effluent. If the hydrocarbon is methane, the reaction proceeds according to one or both of the following reactions:

(1)    $CH_4 + 2H_2O = 4H_2 + CO_2$ (2)    $CH_4 + H_2O = CO + 3H_2$

In a catalytic reforming process, the reaction is considered to proceed according to reaction (2), together with the following reaction:

(3)    $CO + H_2O = CO_2 + H_2$

Thus, the resultant products are determined by the ratio of mols of steam to mols of methane.

The steam reforming process is generally effected in a furnace containing a radiant heating zone in which there is positioned a plurality of tubes containing a reforming catalyst, such as nickel oxide. A mixture of a hydrocarbon feed and steam is introduced into the tubes at a temperature below about 1000° F. and heated in contact with the catalyst to produce a hydrogen containing effluent. The effluent is generally withdrawn from the catalyst tubes at a temperature ranging from about 1400° F. to 1800° F. In the case where the hydrocarbon is, for example, natural gas, coking is minimal under these conditions but when the hydrocarbon feed is rich in carbon monoxide, coking presents a serious problem.

Accordingly, an object of this invention is to provide an improved process for producing hydrogen.

Another object of this invention is to provide an improved process for reforming a carbon monoxide rich hydrocarbon feed gas.

A further object of this invention is to provide an improved reformer furnace.

Still another object of this invention is to provide an improved reformer furnace particularly adapted for reforming a carbon monoxide rich feed gas.

These and other objects will become readily apparent from reading the following detailed description of the invention with reference to the accompanying drawings wherein like numerals represent like parts throughout and wherein.

Figure 1:
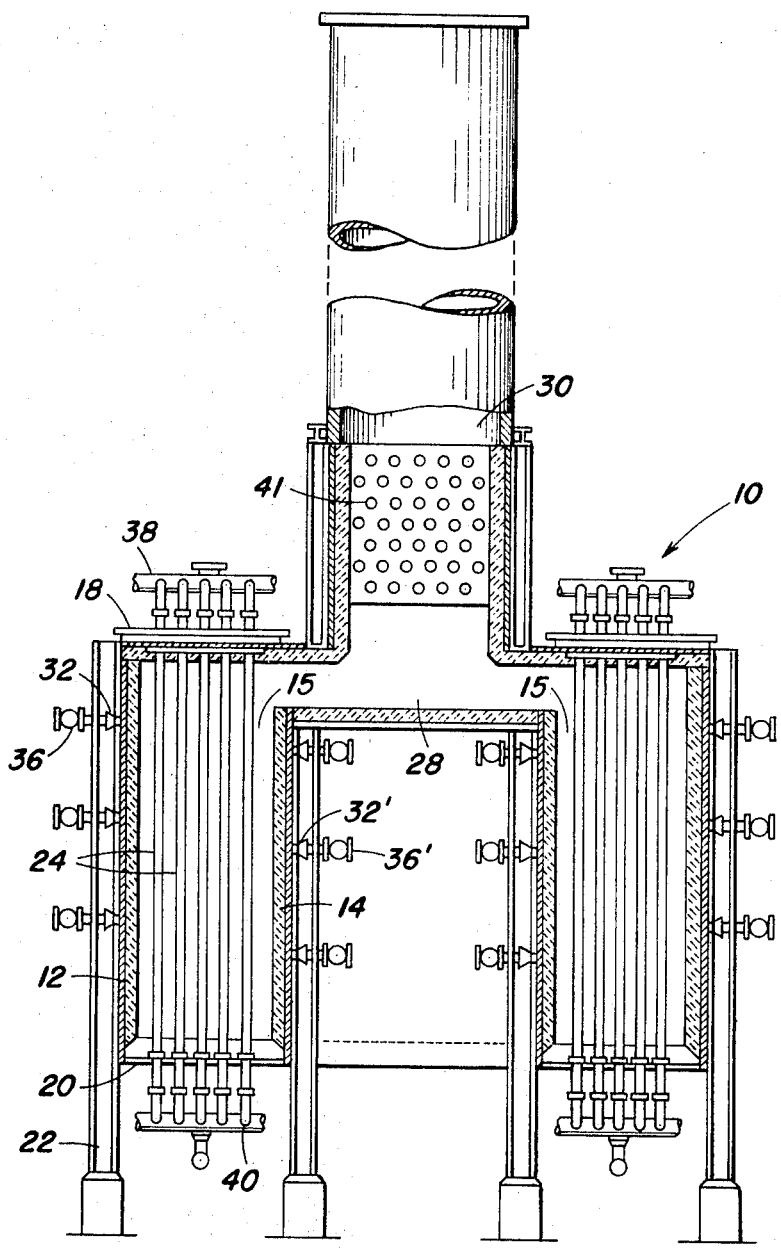
FIG. 1 is a cross-sectional elevation of a hydrocarbon reformer which may employ the principles of the present invention.

The objects of this invention are accomplished by rapidly preheating a carbon monoxide rich-hydrocarbon feed gas in the absence of a catalyst, to a temperature above the temperature range at which the formation of carbon is favorable. More particularly, a mixture of a carbon monoxide rich hydrocarbon and an oxygen containing compound which can react with the carbon of the hydrocarbon, such as steam, is rapidly preheated in the radiant heating zone of a reformer furnace to a temperature above about 1300° F., preferably between about 1300 and about 1400° F. The preheated feed is then heated in the radiant heating zone of the reformer furnace in contact with a reforming catalyst, such as nickel oxide, to produce a hydrogen containing effluent. The effluent is generally withdrawn from the radiant heating zone at a temperature between about 1400 and about 1800° F. By rapidly preheating the feed to a temperature above about 1300° F., in the absence of the reforming catalyst, coking is greatly reduced.

The process of the invention is preferably effected in a steam reformer furnace as the one illustrated in the drawings, but it is to be understood that the process is not limited to such a furnace.

A typical furnace for producing hydrogen in a steam reformer is shown in FIG. 1 and generally designated by the numeral 10. The steam reformer 10 is supported by suitable structural framing 22. Mounted upon said framing are two chambers 15 which comprise outer wall 12, inner wall 14, upper roof 18 and floor 20, all of which are suitably refractory lined. Vertically positioned radially extending tubes 24 are located within chambers 15, and connect with inlet conduit 38 above roof 18 and outlet conduit 40 below floor 20.

Burners 32 are evenly distributed on outer wall 12, and burners 32' are similarly placed on inner wall 14, burners 32 and 32' being placed so that individual burners do not directly face each other.

In operation, process fluids are introduced through inlet conduit 38 into process tubes 24 where, in the presence of a catalyst, they are subjected to heat from the combustion of fuels supplied by burners 32 and 32'. Reaction proceeds within tubes 24 and the reaction products are withdrawn through outlet conduit 40. Within chambers 15, the generated combustion gases are exhausted through duct 28 at the upper end thereof. The ducts 28 extend to the convection unit 41 enroute to the stack 30. The burners 32 and 32' are regulated by suitable valves 36 and 36', respectively, to controllably vary heat to the tubes 24.

In a steam reformer, it is desirable to apply heat in accordance with the requirements of the reaction kinetics at all locations within the tubes. Accordingly, the burners should be regulated to meet these requirements.

The steam reformer 10 has certain inherent advantages due to the configuration of the furnace. In addition, the ability to control the heat uniformly over the length of the tubes 24 is enhanced by the fact that the burners 32' can be placed on the inner wall 14 without difficulty and in fact, these burners enable a uniform heat transfer to be achieved to all of the tubes 24 independent of their position within the chambers 15. The positioning of the burners 32 and 32' between adjacent groups of tubes 24 insures uniform heating to all of the tubes in each grouping.

As was stated hereinabove, carbon formation is a serious problem when utilizing the reformer furnace for reforming a carbon monoxide rich hydrocarbon feed gas. The present invention overcomes this problem by rapidly heating the feed gas in the upper portion of tubes 24, in the absence of catalyst, to a temperature above the range at which carbon formation is favorable.

Figure 2:
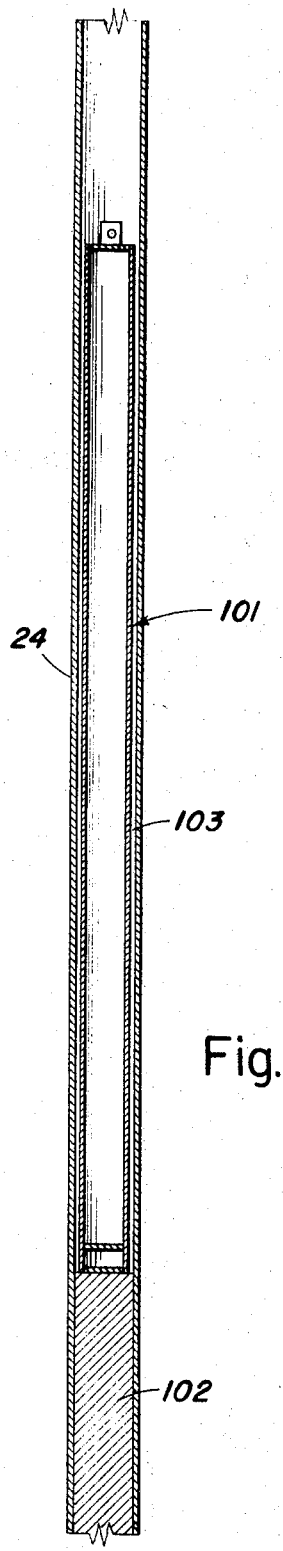
FIG. 2 is a partial cross-sectional elevation of one of the tubes utilized in the apparatus of FIG. 1.

In FIG. 2, there is shown a tube 24 of furnace 10 which is constructed of an alloy suitable for the temperature, pressure and heat flux conditions of the furnace 10. The upper section of tube 24 contains a cylindrical plug or channelling member, generally indicated as 101 and hereinafter more fully described, which is positioned on the top of a suitable catalyst bed, such as nickel oxide, schematically indicated as 102. The catalyst bed 102 may be in the form of pellets, catalyst inserts, such as described in application Ser. No. 384,705 filed July 23, 1964 or in any other suitable form. The plug 101 has an outer diameter less than the inner diameter of the tube 24 and thus forms a restricted passage, generally indicated as 103 within the upper section of the tube 24. The plug 101 is either formed of a material or coated with a material which is noncatalytic with respect to the coking reaction, for example, a spray coating of aluminum. It is also generally preferable to spray coat the upper section of the tubes 24 with a material that is noncatalytic with respect to the coking reaction.

Figure 3:
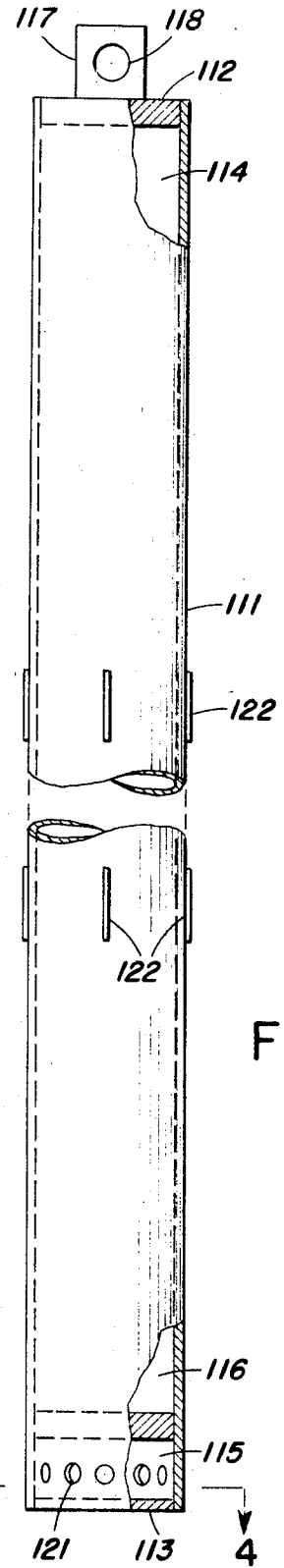
FIG. 3 is a partial cross-sectional elevation of a plug for the tubes of FIG. 2.
Figure 4:
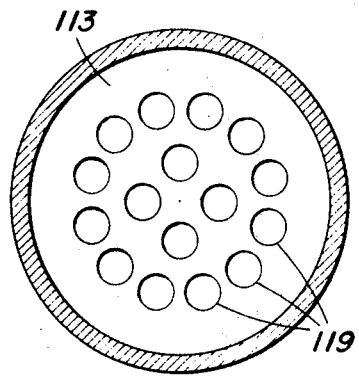
FIG. 4 is a sectional view taken along the line 3—3 of FIG. 3.

The plug 101, shown in more detail in FIGS. 3 and 4, is comprised of a hollow shell 111 which is closed at the upper end by a circular upper plate 112 and at the lower end by a circular lower plate 113. The interior of shell 111 is divided into an upper chamber 114 and a lower chamber 115 by an intermediate circular plate 116. The plates 112, 113 and 116 are connected to the inner periphery of the shell 111 by a suitable means, such as a weld.

An axially extending plate 117, containing a hole 118 is connected to the upper plate 112 by a suitable means, such as a weld. The hole 118 of plate 117 functions as a receptacle for a hook or the like for lowering and raising the plug 101 into and out of the tubes 24 of furnace 10.

The lower plate 113 is provided with a plurality of holes 119 which are arranged in two circles of different diameters. The holes 119 of each circle are equally spaced from each other. The outer periphery of shell 111 forming the exterior of lower chamber 115 is provided with a plurality of holes 121 arranged in a circular row around the entire periphery of shell 111. With holes 121 being equally spaced from each other. The holes 121 of shell 111, the lower chamber 115 and the holes 119 of lower plate 113 provide a continuous passage between the restricted passage 103 in tubes 24 and the catalyst bed 102 to effect an even distribution of the gases over the catalyst bed 102.

The outer periphery of shell 111 is also provided with a plurality of rods 122 arranged in two circular rows longitudinally spaced from each other and fastened thereto by a suitable means, such as a weld. The diameter of the rods 122 is of a dimension such that the rods 122 touch or almost touch the inside of tubes 24 when the plug 101 is positioned therein. The rods 122 function both as guides for positioning and means for supporting the plug 101 in the tubes 24.

In operation, gases introduced into the tubes 24 pass through the restricted passage 103 formed by the plug 101 wherein the mass velocity of the gas is increased. The increase in mass velocity of the gas results in an increased rate of heat transfer from the chamber 15 of the reformer furnace 10 to the gas flowing in restricted passage 103 and produces a rapid heating thereof. A portion of the heated gas in restricted passage 103 flows directly to catalyst bed 102 and the remaining portion flows thereto through the holes 121, the lower chamber 115 and the holes 119 of the plug 101.

It should be readily apparent to those skilled in the art that the dimensions of the upper section of the tubes 24 and the plug 101 are chosen such that the gas introduced into the catalyst bed 102 is at a temperature of at least about 1300° F. Thus, for example, good results may be obtained, in accordance with the teachings of the invention, by providing a plug having an outer diameter of about four and one-half inches, and a length of about seven feet in a tube having an inside diameter of about 4.75 inches, containing a catalyst bed which is positioned about seven and one-half feet from the top of the tubes.

The apparatus of this invention may be modified in numerous ways without departing from the scope of the invention. Thus, for example, the plug 101 may be provided with a hollow tube, open at both ends, passing through the upper chamber 114 and connected by a suitable means, such as a weld to upper plate 112 and intermediate plate 116. The tube provides a passage for the insertion of a thermocouple into lower chamber 115 which is used to measure the temperature of the gas being introduced into the catalyst bed 102.

Although particularly good results are obtained by using the plug illustrated in the drawings, plugs of other shapes are operable, provided they increase the mass velocity of the feed gas flowing through the tubes 24 without increasing the pressure drop therethrough beyond an economical limit.

The above modifications and numerous other modifications should be apparent to those skilled in the art from the teachings of the invention.

The reformer furnace described hereinabove is particularly effective for catalytically reforming a carbon monoxide rich feed gas. Although the use of plug 101 decreases the volume of catalyst in tubes 24, it is not necessary to increase the size or number of catalyst tubes because the reforming reaction is heat transfer limited rather than activity limited.

The following example is illustrative of the invention but the scope of the invention is not to be limited thereby.

EXAMPLE

A reformer furnace contains 92 tubes, having an inside diameter of 4.75", in the radiant section thereof, and the tubes are provided with a plug, of the type hereinabove described. The plug has a length of 5'6" and a diameter of 4.5".

The following gas feed is introduced into the tubes provided with a nickel base catalyst, at a temperature of 900° F.

TABLE I

|  | Lb. mole/hr. | Mole percent |
|---|---|---|
| Methane | 280.4 | 5.6 |
| Ethylene | 15.6 | 0.31 |
| Propylene | 3.9 | 0.08 |
| Carbon Dioxide | 74.0 | 1.48 |
| Carbon Monoxide | 1,047.7 | 20.93 |
| Hydrogen | 2,375.8 | 47.47 |
| Nitrogen and Argon | 77.9 | 1.56 |
| Oxygen | 7.8 | 0.16 |
| Steam | 1,121.6 | 22.41 |
| Total | 5,004.7 | 100.00 |

The temperature of the feed gas introduced into the catalyst portion of the tubes is 1300° F. and the total pressure drop during passage through the restricted portion of the tubes is 2.4 p.s.i.a.

The effluent withdrawn from the furnace is at a temperature of 1775° F. and has the following composition:

TABLE II

|  | Lb. mole/hr. | Mole percent |
|---|---|---|
| Methane | 20.46 | .36 |
| Carbon Dioxide | 172.67 | 3.09 |
| Carbon Monoxide | 1,251.87 | 22.42 |
| Hydrogen | 3,324.49 | 59.54 |
| N₂+Argon | 77.9 | 1.39 |
| Steam | 735.69 | 13.20 |
| Total | 5,583.08 | 100.00 |

The coking during the reforming process is minimal.

The process and apparatus of the invention are effective for catalytically reforming a wide variety of feed gases to produce hydrogen and are particularly effective for steam reforming a hydrocarbon feed gas rich in carbon monoxide. The feed gas may be obtained from a wide variety of sources. Thus, for example, in the cracking of ethane, propane, and naphtha feeds, an effluent is produced which contains, hydrogen, carbon monoxide, methane and heavier hydrocarbons. The heavier hydrocarbons are separated from the effluent and fractionated to recover the various hydrocarbon fractions. The remaining portion of the effluent, containing carbon monoxide, hydrogen and methane, depending on the quantities of carbon monoxide and methane, may then be subjected to the process of the invention.

Many modifications and variations of the present invention are possible in the light of the above teachings. It is therefore to be understood, that within the scope of the appended claims, the invention may be practiced otherwise than as specifically described.

What is claimed is:

1. In a process for catalytic steam reforming of a carbon monoxide rich hydrocarbon feed gas in a tubular furnace to produce hydrogen, the improvement for minimizing coke formation, comprising:
   (a) introducing a mixture of said carbon monoxide rich hydrocarbon feed gas and steam into a tube positioned in the radiant heating zone of the reformer furnace;
   (b) passing said mixture through a restricted portion of said tube, free of a reforming catalyst, to increase the mass velocity of the feed mixture therethrough and thereby increase the rate of heat transfer to the mixture from the radiant heating zone and resulting in a rapid preheating of said feed to a temperature of above about 1300° F. but not greater than about 1400° F.;
   (c) passing the thus-preheated mixture through a further portion of the tube in said radiant heating zone in contact with a reforming catalyst therein while heating the preheated mixture to a temperature from about 1400° F. to about 1800° F. to produce a gaseous effluent comprising hydrogen.

2. The process as defined in claim 1 wherein the feed gas and steam is passed downwardly through the tube.

3. The process as defined in claim 1 wherein the portion of the tube which is free of a reforming catalyst is coated with aluminum.

References Cited

UNITED STATES PATENTS

| 2,998,303 | 8/1961 | Huebler | 23—212 |
| 3,094,391 | 6/1963 | Mader | 23—212 |
| 3,106,457 | 10/1963 | Lockerbie et al. | 23—212 |
| 3,120,431 | 2/1964 | Carton et al. | 23—212 XR |
| 3,147,080 | 9/1964 | Jahnig | 23—212 |
| 3,361,534 | 1/1968 | Johnson et al. | 23—210 |
| 3,385,670 | 5/1968 | Van Hook et al. | 23—212 |

EDWARD STERN, Primary Examiner

U.S. Cl. X.R.

23—288; 252—373